United States Patent
Jeon et al.

(10) Patent No.: US 11,065,944 B2
(45) Date of Patent: Jul. 20, 2021

(54) DOOR FOR VEHICLE

(71) Applicants: Hyundai Motor Company, Seoul (KR); Kia Motors Corporation, Seoul (KR); Duckyang Ind. Co., Ltd., Ulsan (KR)

(72) Inventors: Dongmin Jeon, Suwon-si (KR); Yong Hyun Nam, Gunpo-si (KR); Hi Su Cho, Suwon-si (KR); Sae Hoon Oh, Suwon-si (KR)

(73) Assignees: Hyundai Motor Company, Seoul (KR); Kia Motors Corporation, Seoul (KR); Duckyang Ind. Co., Ltd., Ulsan (KR)

( * ) Notice: Subject to any disclaimer, the term of this patent is extended or adjusted under 35 U.S.C. 154(b) by 31 days.

(21) Appl. No.: 16/132,172

(22) Filed: Sep. 14, 2018

(65) Prior Publication Data

US 2019/0184796 A1 Jun. 20, 2019

(30) Foreign Application Priority Data

Dec. 14, 2017 (KR) ........................ 10-2017-0171812

(51) Int. Cl.
*B60J 5/04* (2006.01)

(52) U.S. Cl.
CPC ........... *B60J 5/0402* (2013.01); *B60J 5/0406* (2013.01); *B60J 5/0413* (2013.01); *B60J 5/0481* (2013.01); *B60J 5/0484* (2013.01); *B60J 5/045* (2013.01); *B60J 5/0416* (2013.01); *B60J 5/0437* (2013.01); *B60J 5/0463* (2013.01)

(58) Field of Classification Search
CPC ...... B60J 5/0402; B60J 5/0408; B60J 5/0406; B60J 5/0463; B60J 5/0437; B60J 5/0481; B60J 5/0484
See application file for complete search history.

(56) References Cited

U.S. PATENT DOCUMENTS

| | | | | |
|---|---|---|---|---|
| 4,512,240 | A * | 4/1985 | Mahler | B60J 5/0405 454/124 |
| 9,114,765 | B1 * | 8/2015 | James | B60R 13/04 |
| 9,623,729 | B2 * | 4/2017 | Glaumot | B60J 5/045 |
| 2004/0226158 | A1 * | 11/2004 | Galliani | B60J 5/0463 29/458 |
| 2018/0111456 | A1 * | 4/2018 | Hofer | B60J 5/107 |

FOREIGN PATENT DOCUMENTS

| | | | | |
|---|---|---|---|---|
| DE | 10201203 | A1 * | 7/2003 | B60J 5/0466 |
| EP | 1057671 | A2 * | 12/2000 | B60J 5/0416 |

* cited by examiner

*Primary Examiner* — Gregory J Strimbu
(74) *Attorney, Agent, or Firm* — Morgan, Lewis & Bockius LLP

(57) ABSTRACT

A door of a vehicle may include a first door module forming a door skeleton; a second door module coupled with the first door module and forming a door window; and a door frame coupled to the first door module and engaged with the second door module; wherein the second door module may include a relatively lightweight material as compared to the first door module, reducing weight and cost of the door for the vehicle.

12 Claims, 10 Drawing Sheets

DOOR FOR VEHICLE

CROSS-REFERENCE TO RELATED APPLICATION

The present application claims priority to Korean Patent Application No. 10-2017-0171812 filed on Dec. 14, 2017, the entire contents of which is incorporated herein for all purposes by this reference.

BACKGROUND OF THE INVENTION

Field of the Invention

The present invention relates to a door of a vehicle. More particularly, the present invention relates to a door of a vehicle capable of reducing weight and cost and improving assembling workability.

Description of Related Art

Generally, a vehicle door is provided with a door window to improve the ventilation of the internal to the vehicle, the visibility and the habitability of the passenger, and is usually including a steel material in consideration of collision stability and the like.

That is, the door external panel and the door internal panel of the steel material are coupled to each other form a door skeleton, and a door frame is coupled to the upper portion of the panels to form a door window. A door module provided with a regulator for raising and lowering the door window glass is built in the internal space formed by the combination of the door external panel and the door internal panel.

Furthermore, the door internal panel is combined with a door trim as an internal material provided with a door switch or window switch, and an impact beam is disposed close to the door external panel to increase the side impact rigidity of the door.

However, in the conventional door structure as described above, since the door internal panel and the door frame are usually made of steel, the weight of the door is increased. Since the door internal panel and the door module are separately manufactured so that the number of parts of the door is increased, it is necessary to develop a more innovative vehicle door by reducing the number of parts of the door and reducing the weight of the material.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a door of a vehicle configured for reducing the number of parts of the door by modularizing a large number of parts forming the door, reducing the weight by making a portion of the door module including a relatively lightweight material instead of a steel material, and reducing assembly man hour and cost.

A door of a vehicle according to an exemplary embodiment of the present invention may include a first door module forming a door skeleton, a second door module coupled with the first door module and forming a door window, and a door frame coupled to the first door module and engaged with the second door module.

The first door module may be formed of a metal material, and the second door module may be formed of a plastic material.

The second door module may be coupled with a door trim.

The first door module may include a door external panel disposed outside a passenger compartment, a door internal panel disposed inside the passenger compartment, a door frame coupled to the top portion of the door internal panel, and an impact beam coupled to the door internal panel.

An opening portion may be provided at a center portion of the door internal panel.

A reinforcing beam may be coupled to the door internal panel in a form that traverses a portion of the opening portion of the door internal panel.

The door frame may include a roof portion corresponding to a roof profile of a vehicle body when the door is closed to a vehicle body, a center pillar portion corresponding to a center pillar of the vehicle body when the door is closed to the vehicle, a front pillar portion disposed in front of the center pillar portion along the longitudinal direction of a vehicle and extending in the height direction of the vehicle, a belt line portion extending in the longitudinal direction of the vehicle to correspond to a belt line of the door, and a corner reinforcement member disposed at a corner between the roof portion and the front pillar portion.

The second door module may include a module body of the panel shape, and a door window portion forming the door window and being integrally formed with the module body.

The door window portion may include a roof portion corresponding to the roof profile of the vehicle body when the door is closed to the vehicle body, a center pillar portion corresponding to a center pillar of the vehicle body when the door is closed to the vehicle body, and a corner reinforcing portion disposed at a front corner of the roof portion along the longitudinal direction of the vehicle and coupled to the corner reinforcement member of the door frame.

When the second door module is coupled with the first door module, an internal space is formed therebetween, and a door glass for opening or closing the door window may be inserted into the internal space to be vertically movable.

At least one door checker mounting boss for mounting a door checker may be formed to be integrally protruded toward the outside of a passenger compartment at the external surface of the second door module facing the outside of the passenger compartment.

At least one assemble protrusion inserted and assembled into an assemble hole formed in the door internal panel, may be integrally protruded toward the outside of the passenger compartment near a belt line of the external surface.

An assemble boss for engaging with the door internal panel may be formed to be integrally protruded toward the outside of the passenger compartment at a lower portion of the external surface.

A rigid protruding portion may be formed at a lower portion of the door internal panel. The rigid protruding portion may be engaged with an assemble boss for assembling the door internal panel with the second door module. An extending section may be formed between the rigid protruding portion and the door external panel.

At least one reinforcing rib may be provided near the roof portion, the center pillar portion and a belt line of the second door module.

The reinforcing rib may include a first reinforcing rib extending in the longitudinal direction of a vehicle and a second reinforcing rib extending in the height direction of a vehicle. The first and second reinforcing ribs may be disposed to form lattice pattern together.

The external surface of the center pillar portion may be joined with a garnish. A screw may penetrate the center pillar portion of the second door module and the center pillar portion of the door frame to fasten to a portion of the garnish. A receiving groove may be formed between the garnish and the center pillar portion. A door glass run may be inserted into the receiving groove.

An assemble bolt may penetrate the second door module and the door internal panel to be fasten to each other by a nut near the belt line and a plurality of lower portions of the second door module.

The roof portion of the second door module and the roof portion of the door frame may be fastened to each other by the screw. The screw may be positioned between the second reinforcing ribs formed on the roof portion of the second door module.

The door for a vehicle according to an exemplary embodiment of the present invention may include the first door module made of metal material, the second door module made of lightweight material compared to steel, and a door trim, reducing the number of parts and weight and cost of the door of a vehicle.

Furthermore, since only three door modules need to be assembled to each other, it is possible to reduce assemble man hour, improve assemble workability, and improve the appearance of the door of a vehicle with the simple design of the modules.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 is a cross-sectional view taken along line C-C of FIG. 1.

FIG. 9 is a cross-sectional view taken along line D-D of FIG. 1.

FIG. 10 is a cross-sectional view taken along line E-E of FIG. 1.

Figure 1:
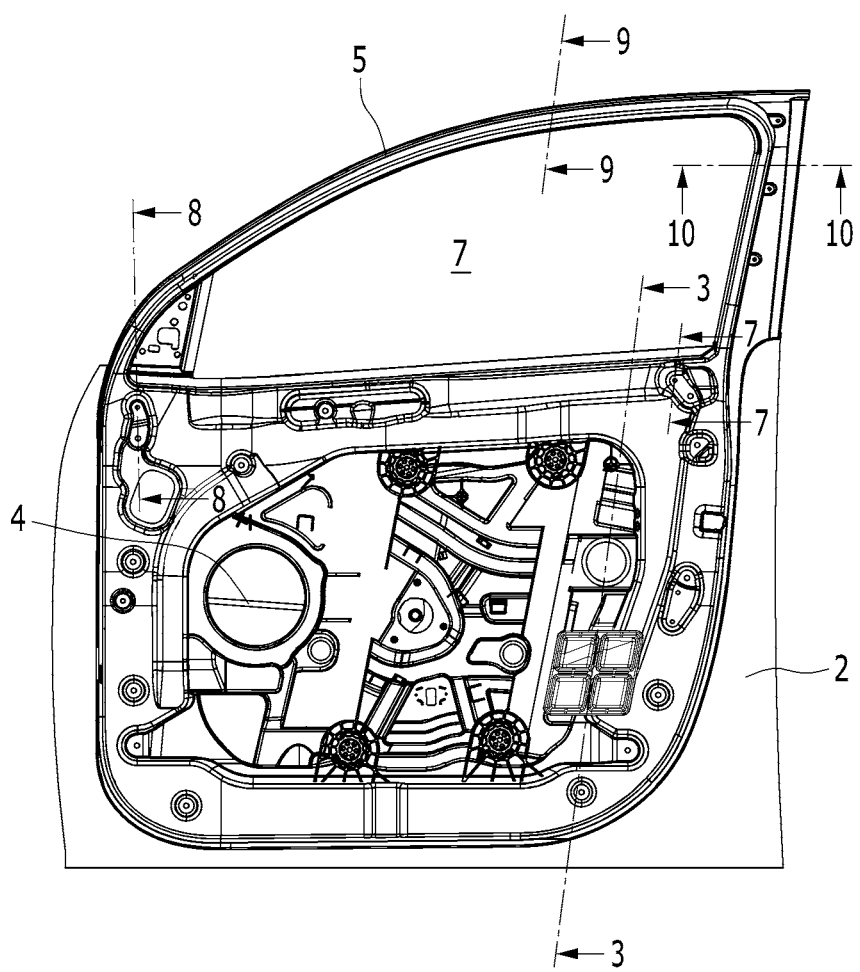
FIG. 1 is a partial internal side view of a door of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments, it will be understood that the present description is not intended to limit the present invention(s) to those exemplary embodiments. On the contrary, the present invention(s) is/are intended to cover not only the exemplary embodiments, but also various alternatives, modifications, equivalents and other embodiments, which may be included within the spirit and scope of the present invention as defined by the appended claims.

Exemplary embodiments of Exemplary embodiments of the present application will be described more fully hereinafter with reference to the accompanying drawings, in which exemplary embodiments of the present invention are shown.

The drawings and description are to be regarded as illustrative in nature and not restrictive. Like reference numerals designate like elements throughout the specification. Since size and thickness of each component illustrated in the drawings are arbitrarily represented for convenience in explanation, the present invention is not particularly limited to the illustrated size and thickness of each component and the thickness is enlarged and illustrated to clearly express various parts and areas.

In the following description, dividing names of components into first, second and the like is to divide the names because the names of the components are the same as each other and an order thereof is not particularly limited.

Throughout the specification, unless explicitly described to the contrary, the word "comprise" and variations such as "comprises" or "comprising", will be understood to imply the inclusion of stated elements but not the exclusion of any other elements.

As those skilled in the art would realize, the described embodiments may be modified in various different ways, all without departing from the spirit or scope of the present invention.

Figure 2:
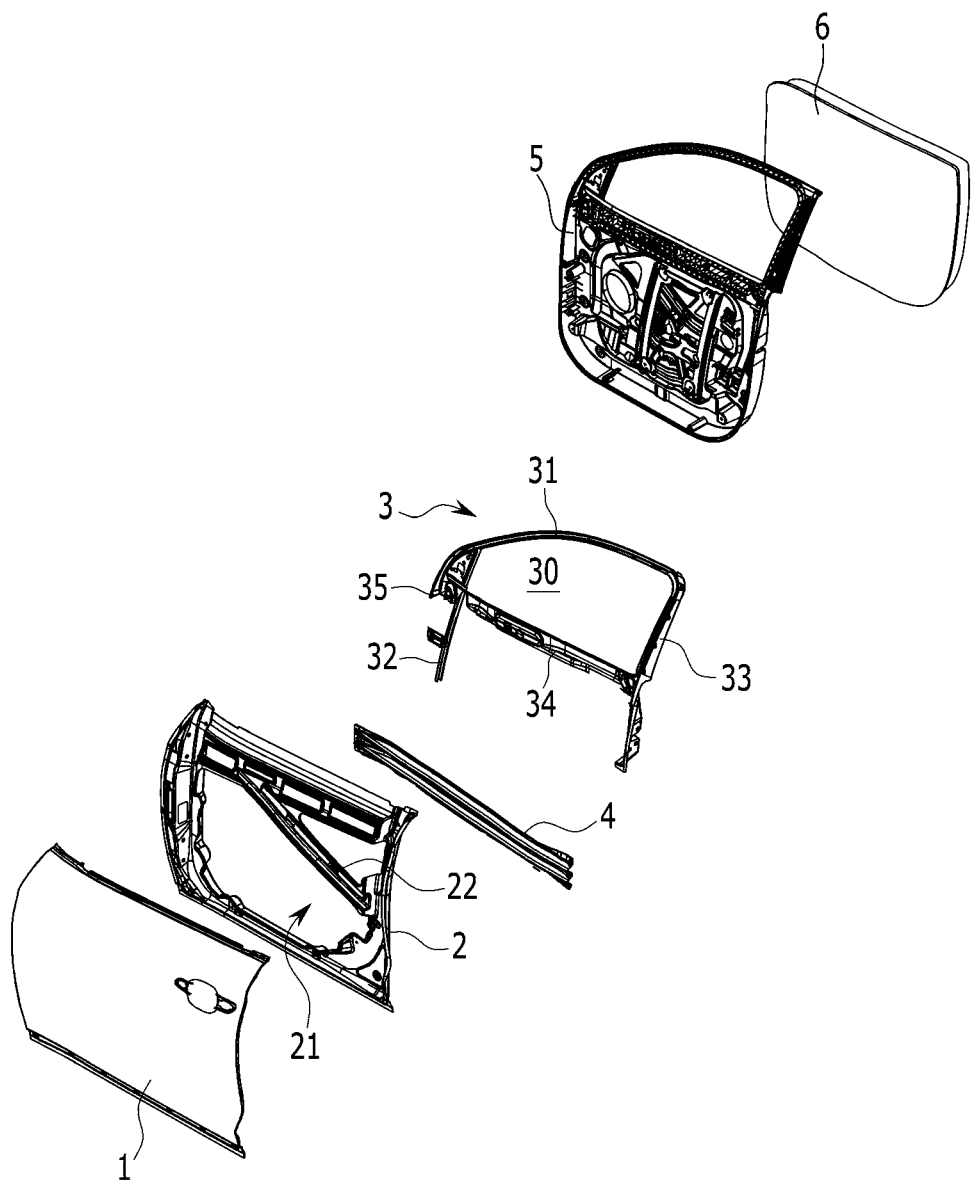
FIG. 2 is an exploded perspective view of a door of a vehicle according to an exemplary embodiment of the present invention.
Figure 3:
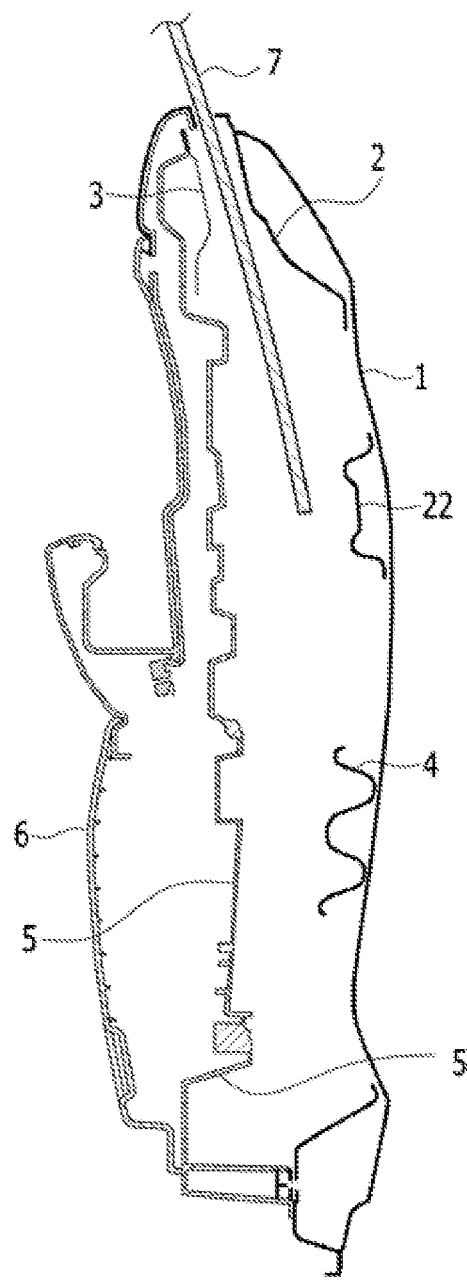
FIG. 3 is a cross-sectional view taken along line 3-3 of FIG. 1.

Referring to FIG. 1 to FIG. 3, a door of a vehicle according to an exemplary embodiment of the present invention may include a first door module having a door external panel 1, a door internal panel 2, a door frame 3 and an impact beam 4, a second door module 5, and a door trim 6 as a third door module.

The door external panel 1 may be disposed outside a passenger compartment and formed into a perfect panel shape in consideration of door rigidity. The door internal panel 2 may be disposed inside the passenger compartment and have an opening portion 21 at a center portion thereof to reduce weight and cost.

The door external panel 1 and the door internal panel 2 may be formed of metal material as steel.

A reinforcing beam 22 may be coupled to the door internal panel 2 in a form that transverse a portion of the opening portion 21.

When the door internal panel 2 is combined with the door external panel 1, the reinforcing beam 22 may be disposed close to the door external panel 1 to support the door external panel 1.

The door frame 3 may be coupled to an upper portion of the door internal panel 2 to form a door window 30.

Figure 4:
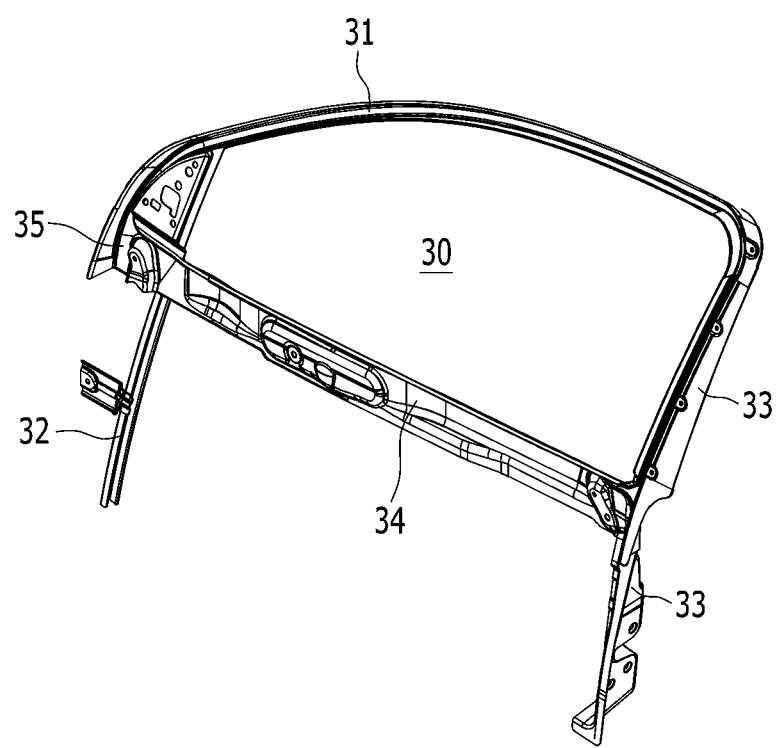
FIG. 4 is a front view of a door frame according to an exemplary embodiment of the present invention.

Referring to FIG. 4, the door frame 3 may include a roof portion 31 corresponding to a roof profile of a vehicle body when the door is closed to a vehicle body, a center pillar portion 33 corresponding to a center pillar of the vehicle body when the door is closed to the vehicle, a front pillar portion 32 disposed in front of the center pillar portion along the longitudinal direction of a vehicle and extending in the height direction of the vehicle, a belt line portion 34 extending between the front pillar portion 32 and the center pillar portion 33 in the longitudinal direction of the vehicle to correspond to a belt line of the door. A corner reinforcement member 35 may be disposed at a corner between the roof portion 31 and the front pillar portion 32.

The door frame 3 may be coupled to the door internal panel 2 and then engaged with the second door module 5 to reinforce the second door module 5.

The impact beam 4 may be coupled to the door internal panel 2 and disposed close to the door external panel 1, absorbing the impact at the side collision and blocking the intrusion of the door into the passenger compartment.

The impact beam 4 and the door frame 3 are coupled to the door internal panel 2 and the door internal panel 2 is coupled to the door external panel 1 so that the first door module as a door skeleton may be formed.

The second door module 5 may include a relatively lightweight material, for example, a plastic material, as compared to the first door module.

Figure 5:
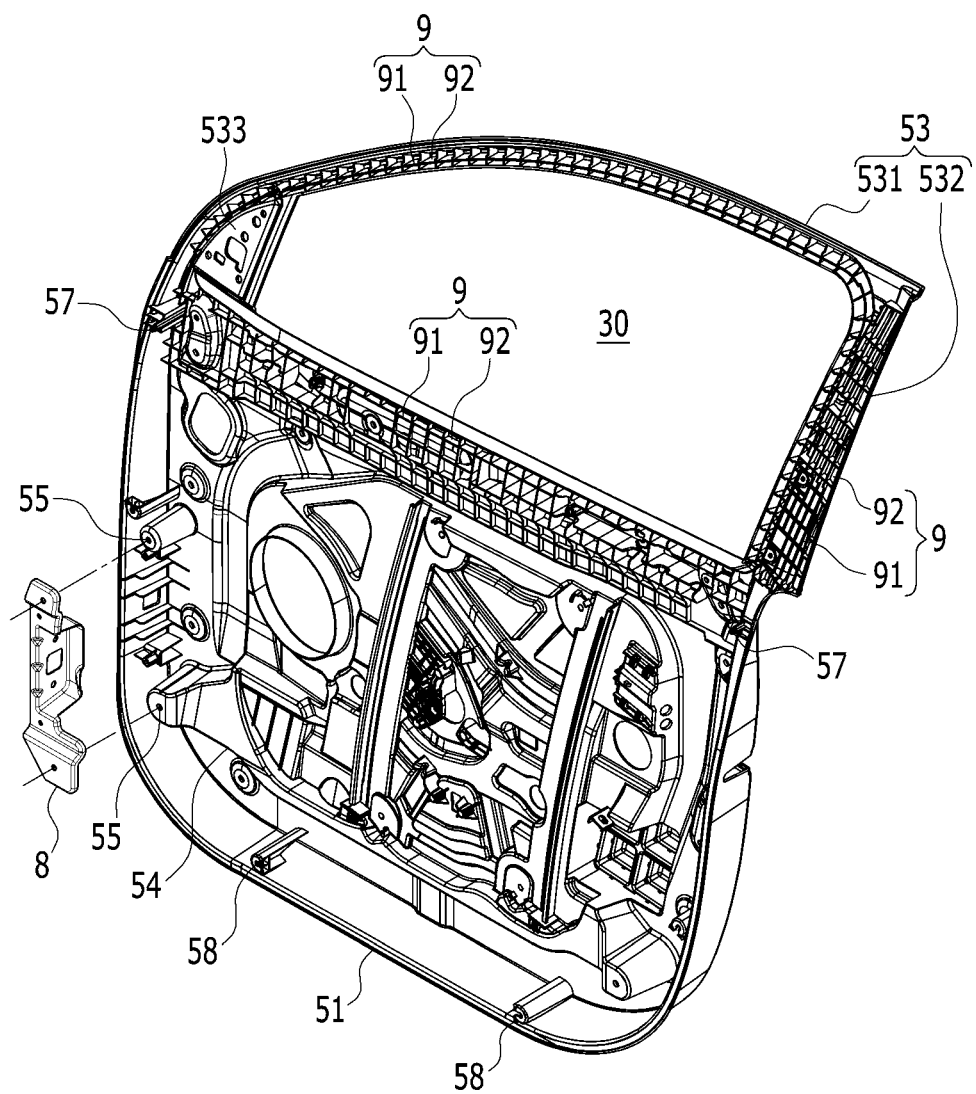
FIG. 5 is a perspective view of the second door module according to an exemplary embodiment of the present invention.

Referring to FIG. 5, the second door module 5 may include a module body 51 of the panel shape, and a door window portion 53 forming a door window 30 and being integrally formed with the module body 51.

The door window portion 53 may include a roof portion 531 corresponding to the roof profile of the vehicle body and a center pillar portion 532 corresponding to a center pillar profile of the vehicle body when the door is closed to a vehicle body.

A corner reinforcing portion 533 is disposed at a front corner of the roof portion 531 along the longitudinal direction of the vehicle and coupled to the corner reinforcement member 35 of the door frame 3.

When the second door module 5 is coupled with the first door module, an internal space is formed therebetween. A door glass 7 for opening or closing the door window 30 may be inserted into the internal space to be vertically movable via a lifting device such as regulator (referring to FIG. 3).

At least one door checker mounting boss 55 for mounting a door checker 8 may be formed to be integrally protruded at the external surface 54 of the second door module 5 facing the outside of the passenger compartment.

Figure 8:
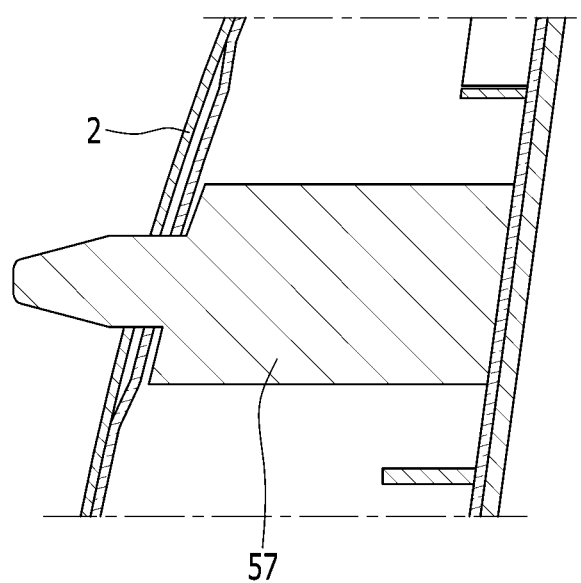
FIG. 8 is a cross-sectional view taken along line 8-8 of FIG. 1.

Furthermore, at least one assemble protrusion 57, which is inserted into an assemble hole formed at the door internal panel 2 and assembled thereto, may be formed to be integrally protruded in the vicinity of the belt line portion at the external surface 54, as shown in FIG. 8. In addition, an assemble boss 58 for assembling with the door internal panel 2 through fastener F may be formed to be integrally protruded toward the outside at a lower portion of the external surface 54, as shown in FIG. 6.

Figure 6:
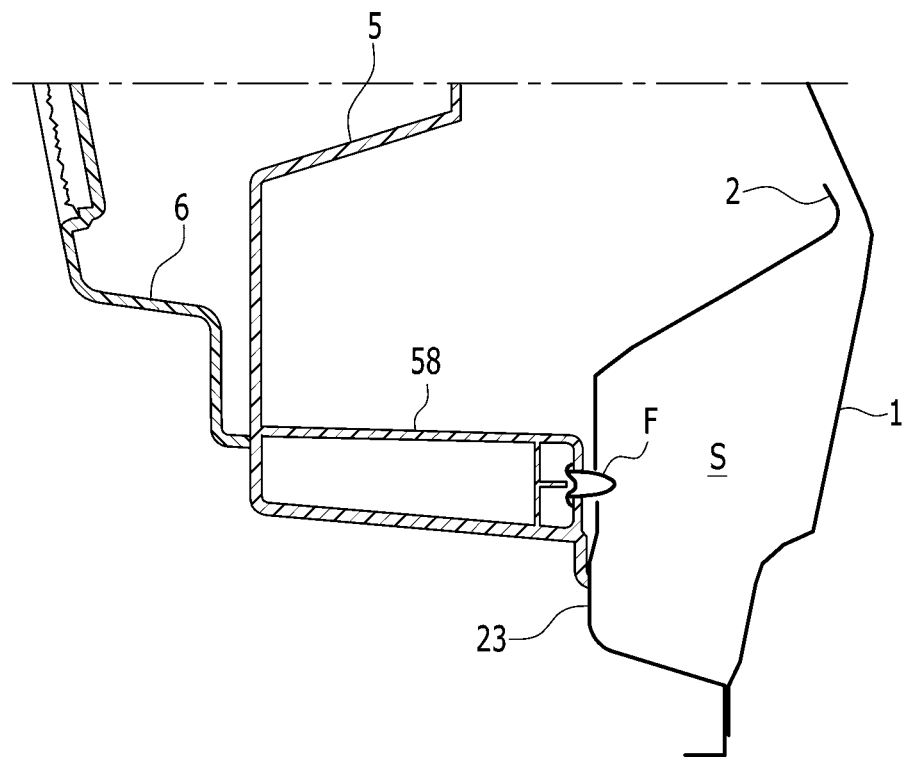
FIG. 6 is a partial enlarged cross-sectional view of FIG. 3.

Referring to FIG. 6, a rigid protruding portion 23 may be formed in a lower portion of the door internal panel 2. The rigid protruding portion 23 may be engaged with the assemble boss 58 of the second door module 5 via the fastener F.

When the door internal panel 2 is coupled to the door external panel 1, the rigid protruding portion 23 is spaced from the door external panel 1 so that an expanded section S may be formed between the rigid protruding portion 23 and the door external panel 1 to increase rigidity. The rigid protruding portion 23 is configured to increase the coupling rigidity between the door internal panel 2 and the second door module 5.

At least one reinforcing rib 9 may be formed at the center pillar portion 532 and the belt line portion of the second door module 5.

The reinforcing rib 9 may be formed by a first reinforcing rib 91 extending in the longitudinal direction for a vehicle and a second reinforcing rib 92 extending in the height direction for a vehicle, which are disposed to form lattice pattern.

The reinforcing rib 9 is configured to reinforce the rigidity of the second door module 5.

Figure 7:
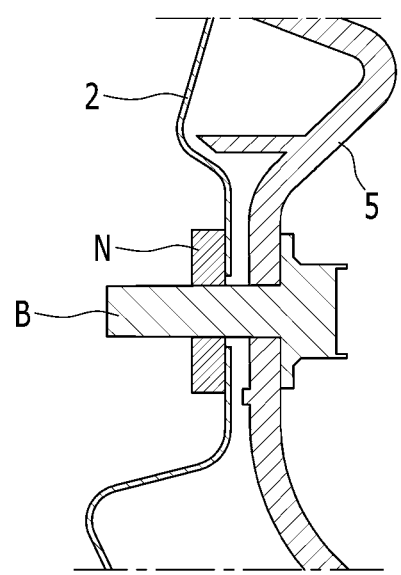
FIG. 7 is a cross-sectional view taken along line 7-7 of FIG. 1.

Referring to FIG. 7, an assemble bolt B may penetrate the second door module 5 and the door internal panel 2 to be fasten to each other by a nut N near the belt line and a plurality of lower portions of the second door module 5.

Figure 9:
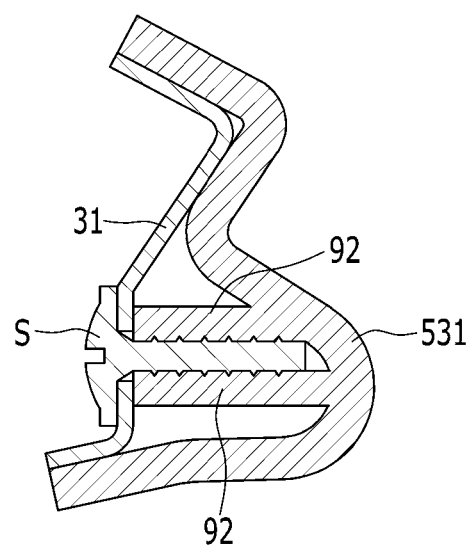
FIG. 9 is a cross-sectional view taken along line 9-9 of FIG. 1.

Referring to FIG. 9, the roof portion 531 of the second door module 5 and the roof portion 31 of the door frame 3 may be fastened to each other by the screw S.

At this time, it is preferable to position the screw S between the second reinforcing ribs 92 formed on the roof portion 531 of the second door module 5.

Figure 10:
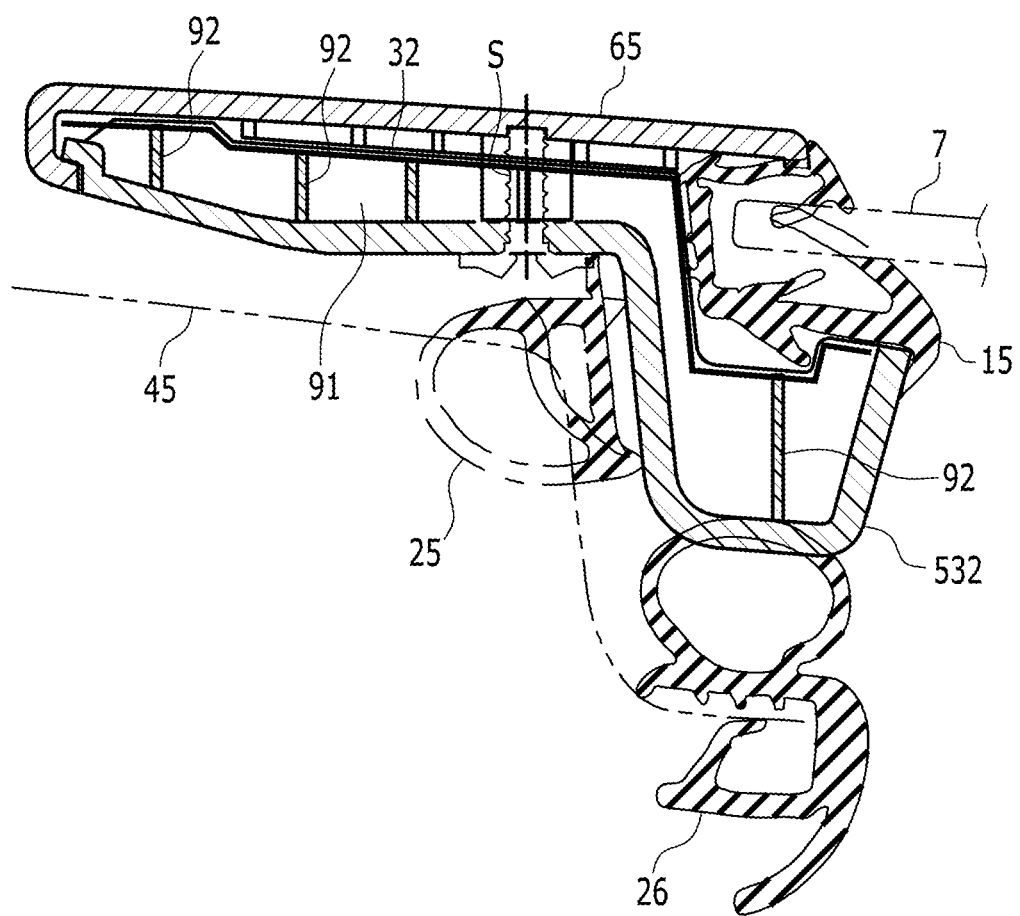
FIG. 10 is a cross-sectional view taken along line 10-10 of FIG. 1.

Referring to FIG. 10, a garnish 65 may be coupled to an external surface of the center pillar portion 532 and the screw S may penetrate the center pillar portion 532 of the second door module 5 and the center pillar portion 32 of the door frame 3 to fasten to a portion of the garnish 65.

A receiving groove may be formed between the garnish 65 and the center pillar portion 532. A door glass run 15, which is configured to guide and support the door glass 7, may be inserted into the receiving groove.

Furthermore, a door weather strip 25 may be attached to the second door module 5 and a vehicle body weather strip 26 may be attached to a vehicle body 45, so that the air-tightness may be maintained when the door is closed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A door of a vehicle, the door comprising:
a first door module forming a door skeleton;
a second door module coupled with the first door module and forming a window opening; and
a door frame disposed between the first door module and the second door module and coupled to the first door module and engaged with the second door module,
wherein the first door module includes:
  a door external panel disposed outside a passenger compartment of the vehicle;
  a door internal panel;
  the door frame coupled to a top portion of the door internal panel; and
  an impact beam coupled to the door internal panel, and
wherein a protruding portion is formed at a lower portion of the door internal panel,
wherein the protruding portion is engaged with an assemble boss formed on the second door module for assembling the door internal panel with the second door module,
wherein a space is formed between the protruding portion and the door external panel,
wherein the door frame includes:
  a first roof portion corresponding to a roof profile of a body of the vehicle when the door is closed to the body;
  a first center pillar portion corresponding to a center pillar of the body when the door is closed to the body of the vehicle;
  a front pillar portion disposed in front of the first center pillar portion along a longitudinal direction of the vehicle and extending in a height direction of the vehicle;
  a belt line portion extending between the front pillar portion and the first center pillar portion in the longitudinal direction of the vehicle; and
  a first corner reinforcement member disposed at a corner between the first roof portion and the front pillar portion and connected to the first roof portion and the front pillar portion,
wherein the second door module includes:
  a module body; and
  a door window portion forming the window opening and being integrally formed with the module body,
wherein the door window portion includes:
  a second roof portion corresponding to the roof profile of the body when the door is closed to the body;
  a second center pillar portion corresponding to the center pillar of the body when the door is closed to the body; and
  a second corner reinforcement member disposed at a front portion of the second roof portion along the longitudinal direction of the vehicle and coupled to the first corner reinforcement member of the door frame,
wherein an external surface of the second center pillar portion is joined with a garnish and a first screw is configured to penetrate the second center pillar portion of the second door module and the first center pillar portion of the door frame to secure to a portion of the garnish to the first center pillar portion,
wherein a receiving groove is formed between the garnish and the second center pillar portion,
wherein a door glass run is inserted into the receiving groove, and
wherein the second roof portion of the second door module and the first roof portion of the door frame are fastened to each other by a second screw which is configured to penetrate the first roof portion and to be positioned in a first reinforcing rib formed on the second roof portion of the second door module.

2. The door of claim 1, wherein the first door module includes a metal material and the second door module includes a plastic material.

3. The door of claim 1, wherein a door trim is coupled to the second door module.

4. The door of claim 1, wherein an opening portion is provided at a center portion of the door internal panel.

5. The door of claim 4, wherein a reinforcing beam traverses a portion of the opening portion of the door internal panel and is fixed to the door internal panel.

6. The door of claim 1, wherein an internal space is formed between the first door module and the second door module when the second door module is coupled with the first door module and wherein a door glass for opening or closing the window opening is inserted into the internal space.

7. The door of claim 1, wherein the second door module includes at least one door checker mounting boss which faces toward the outside of the passenger compartment.

8. The door of claim 7, wherein the second door module includes at least one assemble protrusion inserted into an assemble hole formed in the door internal panel.

9. The door of claim 8, wherein the assemble boss for faces the outside of the passenger compartment at a lower portion of the second door module.

10. The door of claim 1, wherein reinforcing ribs including the first reinforcing rib are provided adjacent to the second roof portion, the second center pillar portion and a belt line of the second door module.

11. The door of claim 10, wherein the reinforcing ribs include:
the first reinforcing rib extending in the height direction of the vehicle; and
a second reinforcing rib extending in the longitudinal direction of the vehicle,
wherein the first and second reinforcing ribs are disposed to form a lattice pattern together.

12. The door of claim 1, wherein an assemble fastener configured to fasten the second door module and the door internal panel together.

* * * * *